July 1, 1930.  R. Z. HOPKINS  1,769,578

SECTIONAL TANK

Filed May 10, 1928  2 Sheets-Sheet 1

Inventor:
Ralph Z. Hopkins
By Macleod, Calver, Copeland & Dike
Attorneys

July 1, 1930.  R. Z. HOPKINS  1,769,578
SECTIONAL TANK
Filed May 10, 1928   2 Sheets-Sheet 2

Inventor:
Ralph Z. Hopkins
By Macleod Calvin Copeland & Dike
Attorneys.

Patented July 1, 1930

1,769,578

UNITED STATES PATENT OFFICE

RALPH Z. HOPKINS, OF DETROIT, MICHIGAN, ASSIGNOR TO HUDSON MOTOR CAR COMPANY, OF DETROIT, MICHIGAN, A CORPORATION OF MICHIGAN

SECTIONAL TANK

Application filed May 10, 1928. Serial No. 276,777.

This invention relates to portable sectional tanks especially adapted for the purpose of containing an acid bath or other solution for cleaning metal articles, such as automobile fenders and body parts, etc.

An object of the invention is to provide an improved tank of this general character wherein the sections and bulkheads of the tank are interchangeable and are capable of being detachably joined together in such manner as to provide sealed, water-tight joints, while at the same time permitting the sections to be readily and quickly disconnected for repair or replacement or to increase or decrease the length of the tank.

Another object of the invention is to provide a tank made up of relatively light interchangeable U-shaped sections which may be readily and easily assembled or knocked-down and to which improved means, portable with each section, is provided for reinforcing and sustaining the same in use.

Another object is to provide a knocked-down tank made up of a plurality of interchangeable sections in which rollers or wheels are provided for supporting each section, preferably traveling on tracks, whereby the sections are independently portable and easily moved separately or together.

The invention will be more clearly understood from the following description in conjunction with the accompanying drawing, in which Fig. 1 is a fragmentary side elevation of the end of a sectional tank embodying the invention, two sections and a part of a third section being shown.

Figure 1:
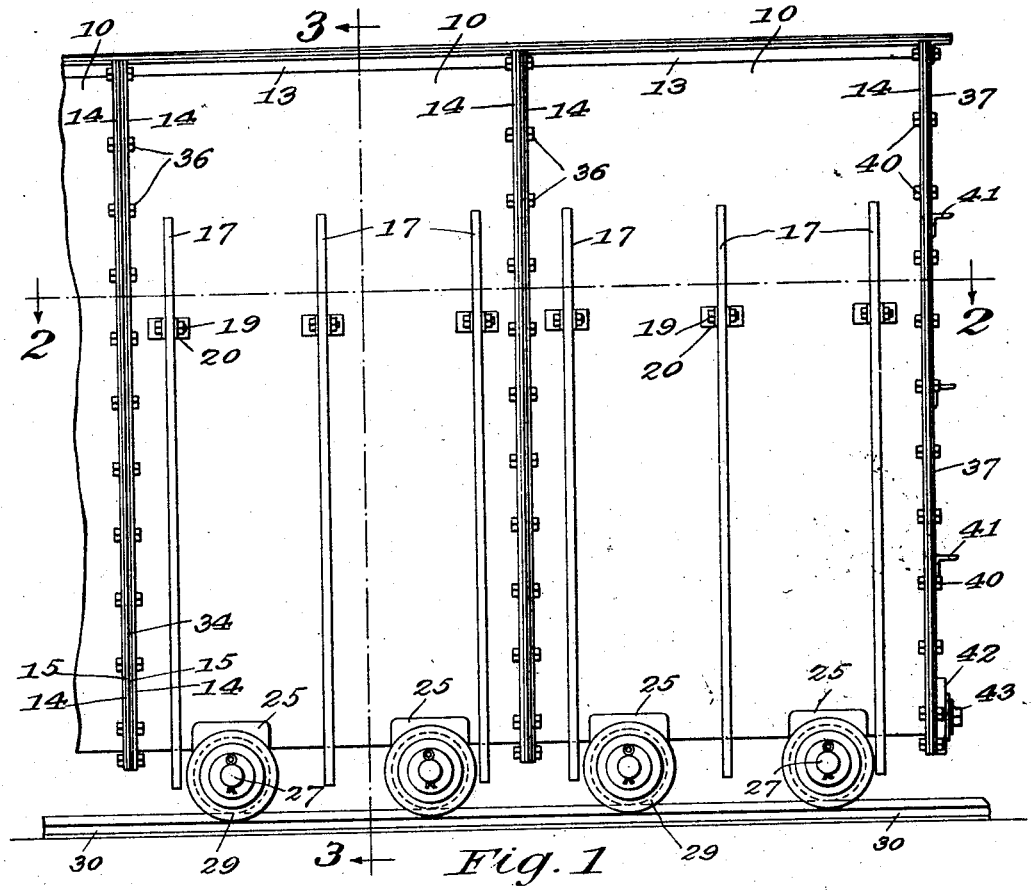
Figure 2:
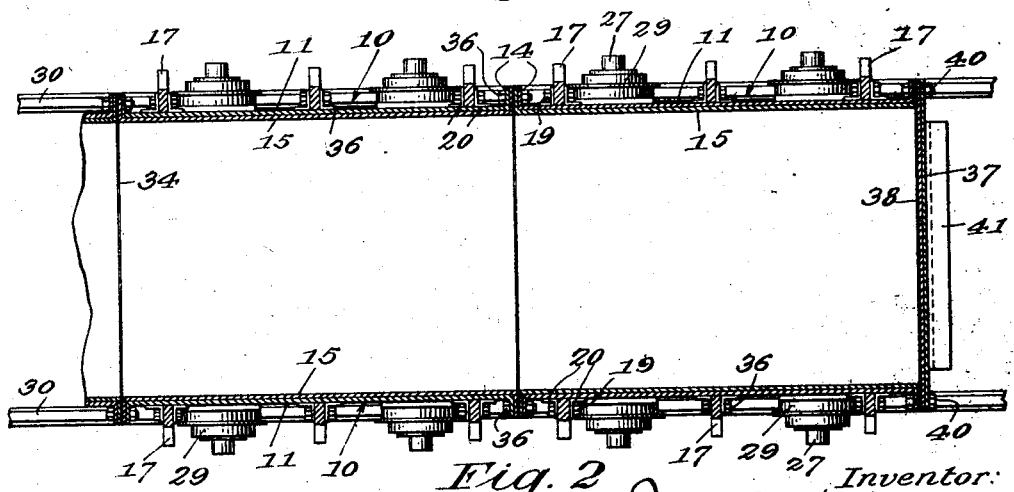
Fig. 2 is a sectional view taken upon line 2—2 of Fig. 1.
Figure 3:
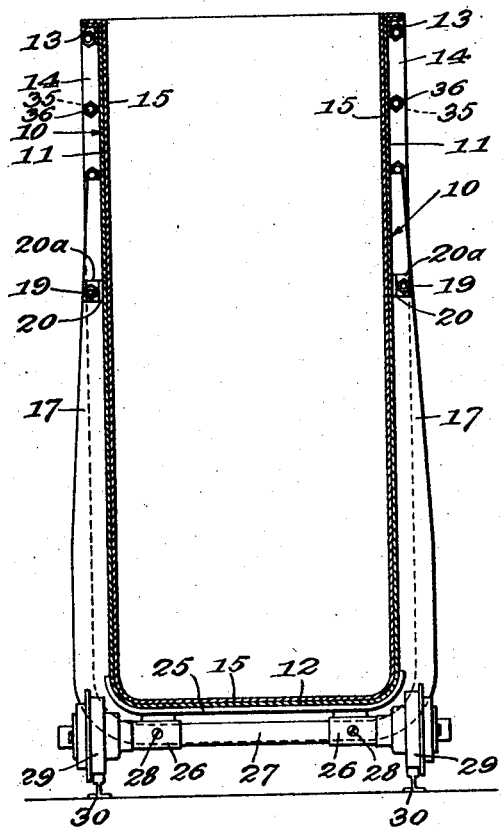
Fig. 3 is a sectional view taken upon line 3—3 of Fig. 1.
Figure 4:
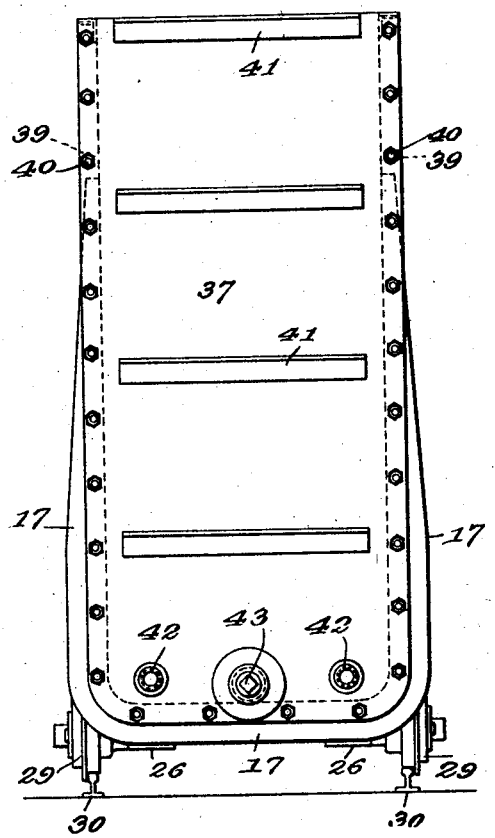
Fig. 4 is an end elevation of the tank.
Figure 5:
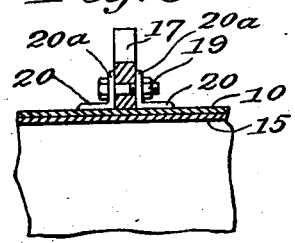
Fig. 5 is a sectional fragmentary view of a portion of the tank showing the connection of the brace member to the side wall.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

As illustrated in the drawings a tank embodying the invention may comprise a plurality of sections of similar construction, shape and form, each comprising a sheet metal member 10 folded to substantially U-shape to form a shell having side walls 11 and a bottom 12 integral therewith. Each section is formed at its end edges with an outwardly extending flange 14. The upper edges of each member 10 are provided with a reinforcing angle bar 13 suitably secured thereto as by welding. A lining 15 of suitable material, such as zinc or lead, for resisting the corrosive action of the liquor or other material contained in the tank is provided upon the interior surface of each section and, preferably, is folded over the flanges 14 and bars 13.

The sheet metal shell or section is preferably reinforced to resist outward pressures. For this purpose one or more U-shaped reinforcing bars 17 of substantially the cross-sectional shape of the tank are positioned edgewise against the outer surface of the bottom 12 and extend upwardly along the outer surface of the side walls 11. These reinforcing bars 17 provide rigid bracing means carried by and portable with the shell or section of the tank, and each brace 17 is suspended in position to clasp the U-shaped shell. This is accomplished by means of angle brackets 20 welded to the shell and bolts and nuts 19 passing through holes in the outwardly extending flanges 20ª of the brackets and also through a hole in the upper end of the brace bar. The U-shaped brace bar is preferably suspended entirely from the angle brackets 20 and normally has a snug fit around the curved base and sides of the shell. It will be noted that when the tank is filled or partially filled with liquid the pressure of the latter will expand the bottom and sides of the shell into tight engagement with the brace bars so that relative movement of these bars at the unsecured bottom thereof will be prevented by this tight frictional fit, and by means of these braces the tank shell will keep its shape.

In the present instance each tank section is carried on a pair of two wheel trucks, each comprising a brace plate 25 pressed into U-shape to embrace the bottom of the shell 10. Secured as by welding to this brace member are bearings 26 carrying a shaft 27 secured thereto by set screws 28. A pair of flanged wheels or rollers 29 are revolubly mounted on the ends of this shaft in any suitable manner. These wheels are mounted upon rails 30, so that the tank sections may be readily moved as a whole or separately.

In accordance with the invention each of the sections 10 are of similar construction so that the tank may be built up to any desired size by assembling a suitable number of sections and so that the sections may be interchanged and replaced if it becomes necessary on account of a leak or the like in any one of the sections. With this in view the similarly shaped flanges 14 upon opposite edges of each section are provided with a plurality of spaced holes 35, each adapted to receive a bolt 36 for detachably clamping the sections together. An end wall or bulkhead 37 of suitable material, such as sheet metal, is shaped to be attached to either end of any section and preferably is provided upon one surface with a suitable lining 38 of a material similar to the lining 15. The bulkhead 37 is provided near its outer edge with a plurality of spaced holes 39 arranged to coincide with the openings 35 upon the flanges 14 so that the bulkhead may be detachably secured to either end of any section, as by bolts 40. If desired a rubber gasket 34 may be positioned between the flanges 14 and between the bulkheads 37 and the flanges. Preferably, the bulkhead 37 is reinforced by a plurality of angle bars 41 positioned in spaced relation upon its outer surface and secured thereto in any suitable manner, as by welding. Each bulkhead may be provided with one or more threaded openings 42 by which a fluid inlet pipe may be detachably connected thereto. If desired each bulkhead may be provided with a removable plug 43 which may be removed when desired to drain the tank of fluid therein.

Figure 6:
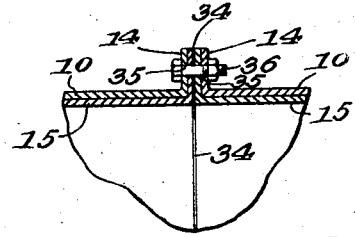
Fig. 6 is a sectional fragmentary view of a portion of the tank showing the connection between adjacent sections.
Figure 7:
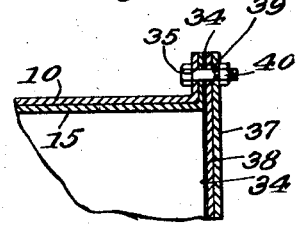
Fig. 7 is a sectional fragmentary view showing the connection between a section of the tank and the end wall or bulkhead.

Referring to Fig. 6 it will be seen that the lining 15 of each section terminates in a flange 15ª, and in securing the sections together the flanges 15ª are clamped between the flanges 14 of the shell sections providing a watertight joint. As shown in Fig. 7 any section with its flanged lining may be interchangeably connected to the bulkhead 37 and clamped by the bolts 40.

In accordance with the present invention, a sectional tank is provided which is particularly adapted for use in large manufacturing establishments for containing an acid bath or other solution for cleaning metal articles such as automobile fenders and body parts and the like. The construction of the tank is such that it may be made of any size to meet the particular requirements at hand by assembling together the required number of sections. Inasmuch as each of the sections are mounted upon a carriage adapted to run upon a track, the tank as a whole is portable and may be moved to any desired location within the plant. Moreover, if for some reason or other a leak develops in the tank, the particular section which is defective may be readily removed and replaced by another section without substantial loss of time. Each section is constructed of relatively thin sheet metal which is reinforced so as to provide a construction of light weight and great strength and rigidity, thus enabling the sections on the entire tank as a whole to be readily and conveniently moved.

What I claim is:

1. In a sectional tank, the combination of a plurality of sections each comprising a U-shaped metal shell having similar outwardly extending flanges at opposite edges, means for interchangeably connecting the flanges of the sections, and a U-shaped metal brace bar embracing each section and positioned edgewise with relation thereto.

2. In a sectional tank, the combination of a plurality of U-shaped sheet metal sections having means for detachably and interchangeably connecting one to another, a U-shaped reinforcing bar clasping the bottom and sides of each section, and means for suspending said bar from the side walls of the section.

In testimony whereof I affix my signature.

RALPH Z. HOPKINS.